United States Patent
Lepage et al.

(10) Patent No.: US 12,449,653 B2
(45) Date of Patent: Oct. 21, 2025

(54) CAMERA MONITOR SYSTEM WITH SELF-CLEANING ARTICULATING CAMERA WING

(71) Applicant: Stoneridge Electronics AB, Solna (SE)

(72) Inventors: Gabriel Lepage, Royal Oak, MI (US); Troy Cooprider, White Lake, MI (US); Banuprakash Murthy, Novi, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 120 days.

(21) Appl. No.: 18/346,334

(22) Filed: Jul. 3, 2023

(65) Prior Publication Data

US 2025/0013037 A1   Jan. 9, 2025

(51) Int. Cl.

| | |
|---|---|
| G02B 27/00 | (2006.01) |
| B60R 1/28 | (2022.01) |
| B60S 1/04 | (2006.01) |
| B60S 1/56 | (2006.01) |
| F16M 13/02 | (2006.01) |
| G03B 17/08 | (2021.01) |
| G03B 17/55 | (2021.01) |
| G03B 17/56 | (2021.01) |

(52) U.S. Cl.
CPC ............ *G02B 27/0006* (2013.01); *B60R 1/28* (2022.01); *B60S 1/04* (2013.01); *B60S 1/56* (2013.01); *F16M 13/022* (2013.01); *G03B 17/08* (2013.01); *G03B 17/55* (2013.01); *G03B 17/561* (2013.01)

(58) Field of Classification Search
None
See application file for complete search history.

(56) References Cited

U.S. PATENT DOCUMENTS 8,753,025 B2   6/2014   Suman et al.
9,319,637 B2   4/2016   Lu et al.
(Continued)

FOREIGN PATENT DOCUMENTS

DE   102013213415 A1   1/2015
DE   102014220257 A1 * 4/2016
(Continued)

OTHER PUBLICATIONS

Extended European Search Report for European Application No. 24183240.1 mailed Dec. 2, 2024.
(Continued)

*Primary Examiner* — Rodney E Fuller
(74) *Attorney, Agent, or Firm* — Carlson, Gaskey & Olds, P.C.

(57) ABSTRACT

A camera arm for a camera monitor system (CMS) includes a base that is configured to be secured to a vehicle, and the base includes a wiper. A pivoting arm is mounted on the base at a joint. An actuator is configured to articulate the pivoting arm relative to the base with the joint. A camera assembly is provided in the pivoting arm and configured to face rearward with the base secured to the vehicle. Articulation of the joint is configured to move the pivoting arm between a deployed position and a stowed position, and the articulation of the joint moves the camera assembly across the wiper in a sliding direction as the pivoting arm moves between the deployed and stowed positions.

17 Claims, 7 Drawing Sheets

(56) References Cited

U.S. PATENT DOCUMENTS

| | | |
|---|---|---|
| 9,445,057 B2 | 9/2016 | May et al. |
| 9,538,054 B2 | 1/2017 | Hayakawa et al. |
| 9,707,896 B2 | 7/2017 | Boegel et al. |
| 9,992,388 B2 | 6/2018 | Romack et al. |
| 10,021,278 B2 | 7/2018 | Lu et al. |
| 10,089,540 B2 | 10/2018 | May et al. |
| 10,155,484 B2 | 12/2018 | Henion et al. |
| 10,183,653 B2 | 1/2019 | Davies et al. |
| 10,397,451 B2 | 8/2019 | Lu et al. |
| 10,814,839 B2 | 10/2020 | Park et al. |
| 10,919,502 B2 | 2/2021 | Rousseau |
| 11,034,299 B2 | 6/2021 | Peterson et al. |
| 11,279,287 B2 | 3/2022 | Boegel et al. |
| 11,485,294 B2 | 11/2022 | Brouwer et al. |
| 11,656,327 B2 | 5/2023 | Gilbertson et al. |
| 11,889,171 B2 | 1/2024 | Condron |
| 11,919,487 B2 | 3/2024 | Davidson et al. |
| 2013/0209079 A1* | 8/2013 | Alexander ............ B60R 11/04 396/25 |
| 2014/0320654 A1* | 10/2014 | Dadeppo ............ B60R 11/04 348/148 |
| 2017/0297535 A1 | 10/2017 | Zhang et al. |
| 2017/0346997 A1 | 11/2017 | Sato et al. |
| 2018/0361998 A1* | 12/2018 | Renaud ............ H04N 23/811 |
| 2019/0039531 A1 | 2/2019 | Wilson |
| 2019/0329719 A1 | 10/2019 | Brouwer et al. |
| 2019/0389430 A1* | 12/2019 | Park ............ B60S 1/566 |
| 2020/0047719 A1 | 2/2020 | Park et al. |
| 2020/0086833 A1 | 3/2020 | Frederick et al. |
| 2022/0234547 A1 | 7/2022 | Lee |
| 2024/0246513 A1* | 7/2024 | LaCross ............ H04N 23/57 |

FOREIGN PATENT DOCUMENTS

| | | |
|---|---|---|
| DE | 102015117612 A1 | 4/2017 |
| DE | 102015118670 A1 | 5/2017 |
| DE | 102016101745 A1 * | 8/2017 |
| EP | 3665045 B1 | 9/2021 |
| JP | 6013922 B2 | 10/2016 |
| JP | 6327514 B2 | 5/2018 |
| KR | 1020180043939 A | 5/2018 |
| KR | 102519400 B1 | 4/2023 |
| WO | 2023121908 A1 | 6/2023 |

OTHER PUBLICATIONS

European Office Action for European Application No. 24183240.1 mailed Aug. 28, 2025.

* cited by examiner

CAMERA MONITOR SYSTEM WITH SELF-CLEANING ARTICULATING CAMERA WING

TECHNICAL FIELD

This disclosure relates to a camera monitor system (CMS) for use in a commercial truck or similar vehicle, and, in particular, to an articulating camera arm or wing with a self-cleaning camera feature.

BACKGROUND

Mirror replacement systems, and camera systems for supplementing mirror views, are utilized in commercial vehicles to enhance the ability of a vehicle operator to see a surrounding environment. Camera monitor systems (CMS) utilize one or more cameras to provide an enhanced field of view to a vehicle operator. In some examples, the CMS covers a larger field of view than a conventional mirror, or include views that are not fully obtainable via a conventional mirror.

In a typical CMS, there is a camera arm arranged on each of the left- and right-hand sides of the vehicle to provide Class II and Class IV views or similar views. A display is provided on the A-pillar on both driver and passenger sides to display the field of view for the camera arm on that side, simulating a conventional mirror.

Each camera arm uses at least one rear-facing camera assembly that provides the rear-facing views to the driver via displays located in the vehicle cabin. While the vehicle is parked and during operation, the cameras can be obstructed by rain, snow, ice and road debris. Obstructions can compromise the quality of the displayed view, which is particularly problematic where the CMS has entirely replaced mirrors.

One proposed camera cleaning system uses a camera arm having a pivoting arm that rotates with respect to a base secured to the vehicle. A camera module is telescopically supported for longitudinal movement relative to pivoting arm. The camera module includes a camera that can be wiped by a wiper on the pivoting arm. A washer spray nozzle is also arranged in the pivoting arm for spraying washer fluid on the camera. This design places numerous components within the arm itself, which requires a large packaging envelope that increases the drag coefficient and reduces fuel economy.

SUMMARY

In one exemplary embodiment, a camera arm for a camera monitor system (CMS) includes a base that is configured to be secured to a vehicle, the base includes a wiper. A pivoting arm is mounted on the base at a joint. An actuator is configured to articulate the pivoting arm relative to the base with the joint. A camera assembly is provided in the pivoting arm and configured to face rearward with the base secured to the vehicle. Articulation of the joint is configured to move the pivoting arm between a deployed position and a stowed position, and the articulation of the joint moves the camera assembly across the wiper in a sliding direction as the pivoting arm moves between the deployed and stowed positions.

In a further embodiment of any of the above, the base includes a pocket that receives a portion of the pivoting arm that includes the camera assembly when in the stowed position.

In a further embodiment of any of the above, the base includes a seal that is arranged about at least a portion of the wiper. The seal provides a camera sealing region that is configured to circumscribe the camera assembly when in the stowed position.

In a further embodiment of any of the above, the camera arm includes a drain from the camera sealing region to a location outside the camera sealing region.

In a further embodiment of any of the above, the camera assembly includes a lens, and a transparent cover is arranged over the lens. The wiper is configured to wipe across the transparent cover while the pivoting arm moves in the sliding direction to remove debris on the transparent cover.

In a further embodiment of any of the above, the camera assembly includes a lens that is exposed to an exterior environment in the deployed position. The wiper is configured to wipe across the lens while the pivoting arm moves in the sliding direction to remove debris on the lens.

In a further embodiment of any of the above, the base includes a heater that is configured to be adjacent to the camera assembly with the pivoting arm in the stowed position.

In a further embodiment of any of the above, the joint includes a linkage and at least one track that is configured to provide rotation of the pivoting arm and movement of the pivoting arm in the sliding direction relative to the base in response to operation of the actuator.

In a further embodiment of any of the above, the base includes at least a portion of a washer system that has a spray nozzle that is configured to spray fluid on the camera assembly in response to an input.

In a further embodiment of any of the above, a CMS that includes the camera arm further includes a controller that is in communication with the actuator, the camera assembly, the washer system and the input. The controller is configured to coordinate operation of the actuator and the washer system in response to the input.

In a further embodiment of any of the above, a CMS that includes the camera arm further includes the camera assembly that includes an image capture unit that is configured to provide at least one of two fields of view, and includes at least one display that is configured to depict at least portions of the at least one of two fields of view.

In another exemplary embodiment, a method of removing debris from a camera monitor system (CMS) camera assembly includes actuating a pivoting arm that is mounted on a base that is secured to a vehicle, articulating the pivoting arm about a joint relative to the base and between a deployed position and a stowed position, sliding the pivoting arm relative to the base in response to the articulating step, and wiping a camera assembly on the pivoting arm across a wiper that is supported on the base in response to the sliding step.

In a further embodiment of any of the above, the articulating step includes rotating the pivoting arm relative to the base.

In a further embodiment of any of the above, the articulating step includes rotating the pivoting arm relative to the base subsequent to the sliding step when moving the pivoting arm from the stowed position to the deployed position. The articulating step includes rotating the pivoting arm relative to the base prior to the sliding step when moving the pivoting arm from the deployed position to the stowed position.

In a further embodiment of any of the above, the wiping step is performed during at least one of a pivoting arm deployment operation and a pivoting arm stowing operation.

In a further embodiment of any of the above, the method includes a step of receiving a portion of the pivoting arm in a pocket in the base in response to moving the pivoting arm to the stowed position.

In a further embodiment of any of the above, the method includes a step of placing the camera assembly adjacent to a heater in the base in response to moving the pivoting arm to the stowed position.

In a further embodiment of any of the above, the method includes a step of placing the camera assembly adjacent within a boundary of a seal on the base in response to moving the pivoting arm to the stowed position.

In a further embodiment of any of the above, the method includes a step of spaying a washer fluid at the camera assembly prior to performing the wiping step.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1A:
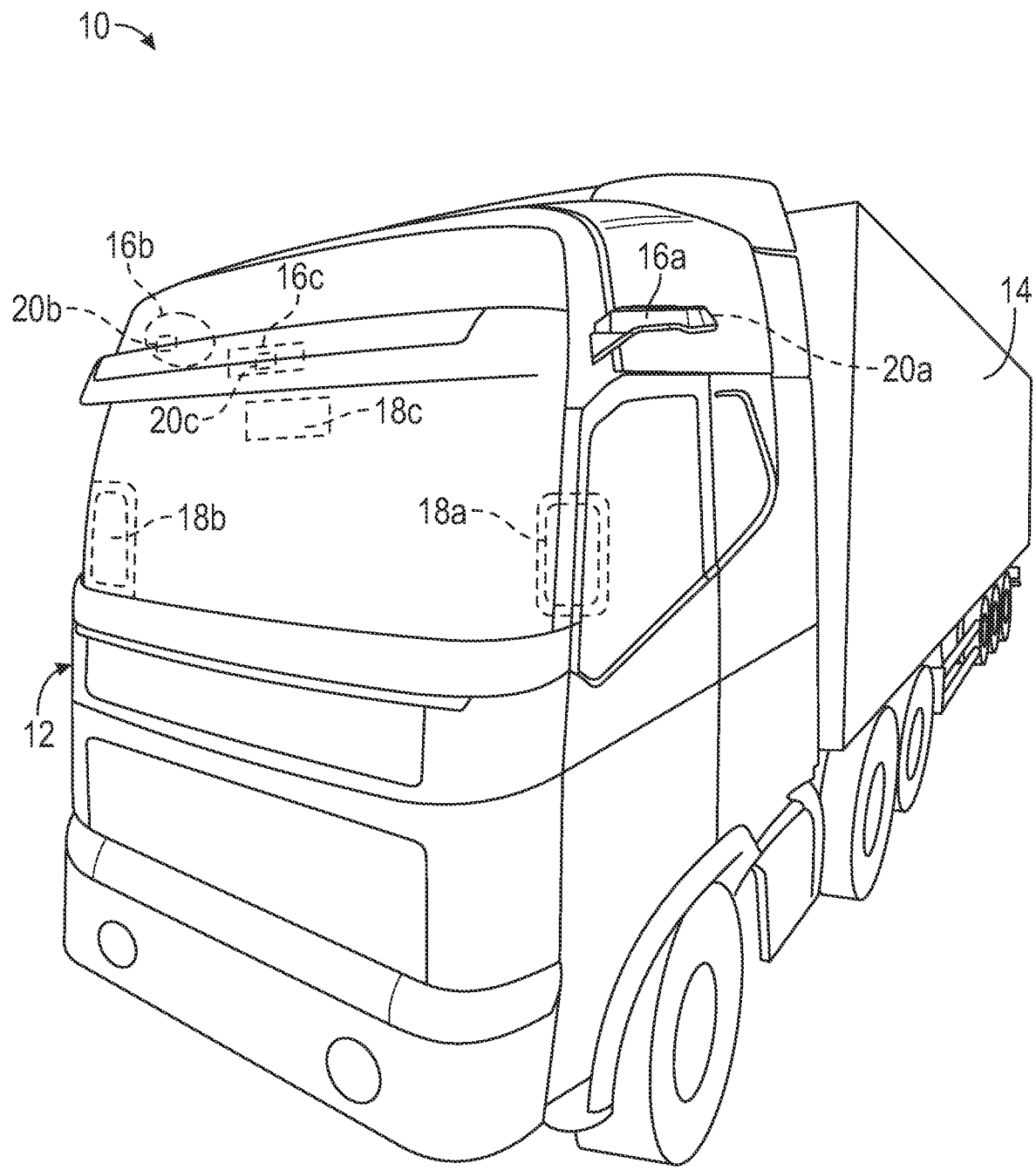
FIG. 1A is a schematic front view of a commercial truck with a camera monitor system (CMS) having camera arms used to provide at least Class II and Class IV views.
Figure 1B:
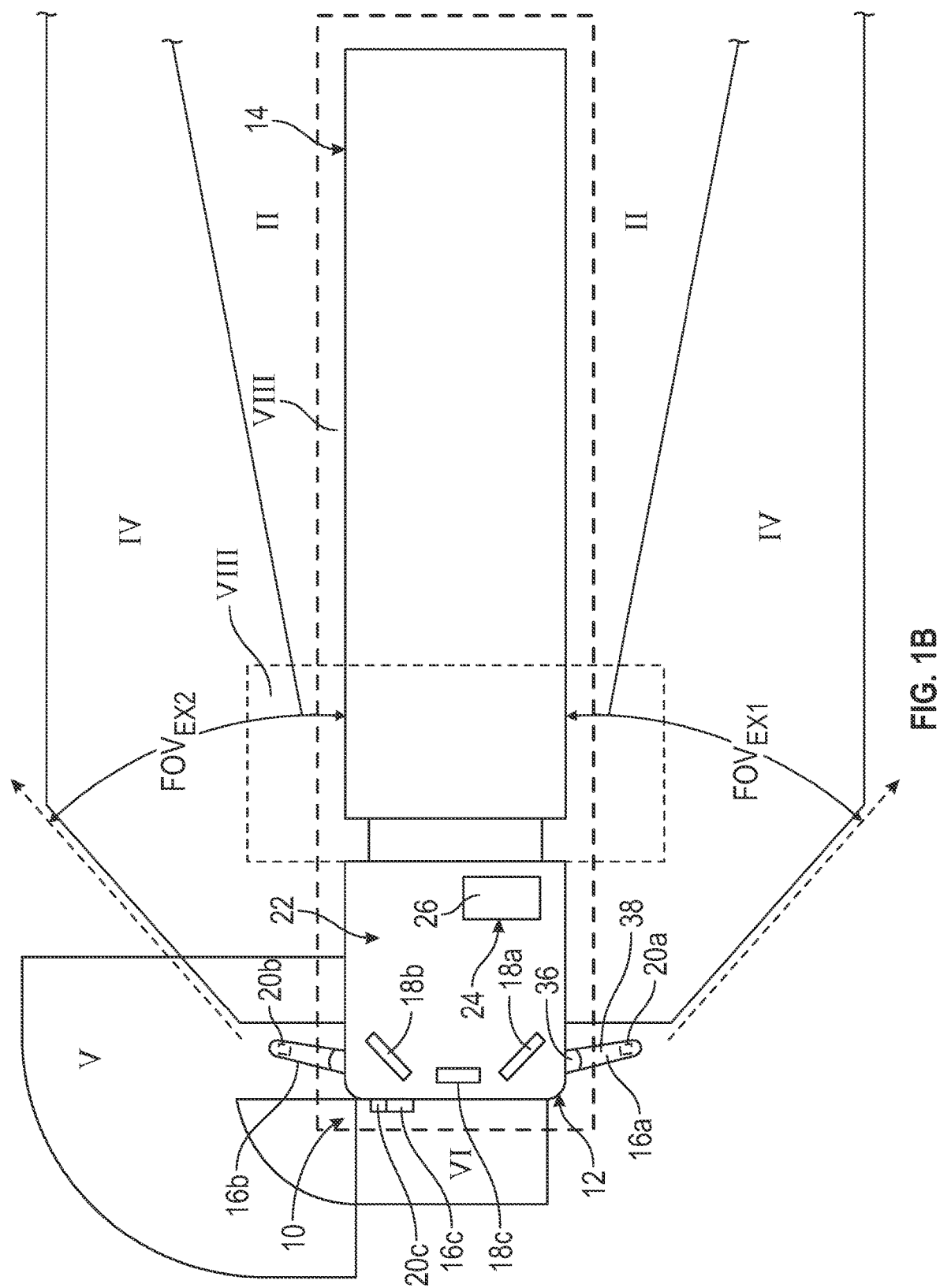
FIG. 1B is a schematic top view of a commercial truck with a camera mirror system illustrating Class II, Class IV, Class V, Class VI and Class VIII views.

A schematic view of a commercial vehicle 10 is illustrated in FIGS. 1A and 1B. The vehicle 10 includes a vehicle cab or tractor 12 for pulling a trailer 14. It should be understood that the vehicle cab 12 and/or trailer 14 may be any configuration. Although a commercial truck is contemplated in this disclosure, the invention may also be applied to other types of vehicles. The vehicle 10 incorporates a camera monitor system (CMS) 15 (FIG. 2A) that has driver and passenger side camera wings or arms 16a, 16b (generally, "camera arm 16") mounted to the outside of the vehicle cab 12. If desired, the camera arms 16a, 16b may include conventional mirrors integrated with them as well, although the CMS 15 can be used in some examples to entirely replace mirrors. In additional examples, each side can include multiple camera arms, each arm housing one or more cameras and/or mirrors.

As shown in FIG. 1B, each of the camera arms 16a, 16b includes a base 36 that is secured directly to, for example, the cab 12, using fasteners or other attaching hardware. A pivoting arm 38 is supported by the base 36 and may articulate relative thereto, if such a feature is desired. In the example, the camera arm 16 has a power fold feature in which an actuator (at 34, FIGS. 2, 4A, 4B, 5B) is used to move the pivoting arm 38 between a stowed position S (FIGS. 3A, 4A) and a deployed position D (FIGS. 3B, 4B). At least one rearward facing camera 20a, 20b (generally, "camera 20") is arranged respectively within camera arms 16a, 16b. Each arm 16a, 16b may also provide a housing that encloses electronics, e.g., a controller 30 (FIG. 2), that are configured to provide various features of the CMS 15.

The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. The Class II view on a given side of the vehicle 10 is a subset of the class IV view of the same side of the vehicle 10. Multiple cameras also may be used in each camera arm 16a, 16b to provide these views, if desired. Class II and Class IV views are defined in European R46 legislation, for example, and the United States and other countries have similar driver visibility requirements for commercial trucks. Any reference to a "Class" view is not intended to be limiting, but is intended as exemplary for the type of view provided to a display by a particular camera.

First and second video displays 18a, 18b are arranged on each of the driver and passenger sides within the vehicle cab 12 on or near the A-pillars 19a, 19b (generally, A-pillar 19), for example, to display Class II and Class IV views on its respective side of the vehicle 10, which provide rear facing side views along the vehicle 10 that are captured by the exterior cameras 20a, 20b.

If video of Class V and/or Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver. The displays 18a, 18b, 18c (generally, display 18) face a driver region 24 within the cabin 22 where an operator is seated on a driver seat 26. The location, size and field(s) of view streamed to any particular display may vary from the configurations described in this disclosure and still incorporate the disclosed invention.

If video of Class VIII views is desired, camera housings can be disposed at the sides and rear of the vehicle 10 to provide fields of view including some or all of the Class VIII zones of the vehicle 10. In such examples, the third display 18c can include one or more frames displaying the Class VIII views. Alternatively, additional displays can be added near the first, second and third displays 18a, 18b, 18c to provide a display dedicated to providing a Class VIII view.

In terms of hardware architecture of the controller 30, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 30 (FIG. 2) may be a hardware device for executing software, particularly software stored in memory. The controller 30 can be a custom made or commercially available processor, a central processing unit (CPU), an auxiliary processor among several processors associated with the controller, a semiconductor-based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The disclosed input and output devices that may be coupled to system I/O interface(s) may include input devices, for example but not limited to, a keyboard, mouse, scanner, microphone, camera, mobile device, proximity device, etc. Further, the output devices, for example but not limited to, a printer, display, etc. Finally, the input and output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller 30 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Figure 2:
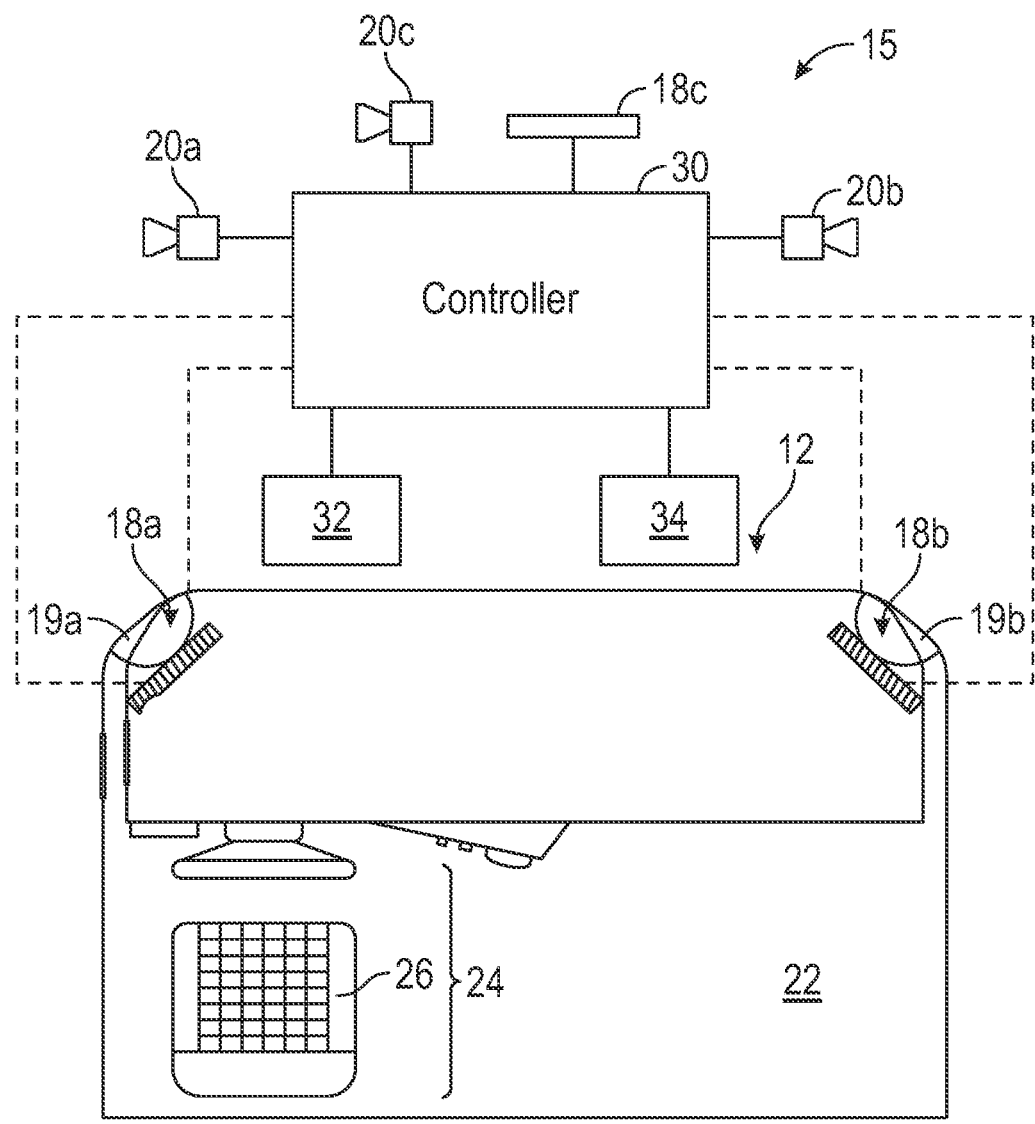
FIG. 2 is a schematic top view of a vehicle cabin incorporating a CMS and including displays.
Figure 3A:
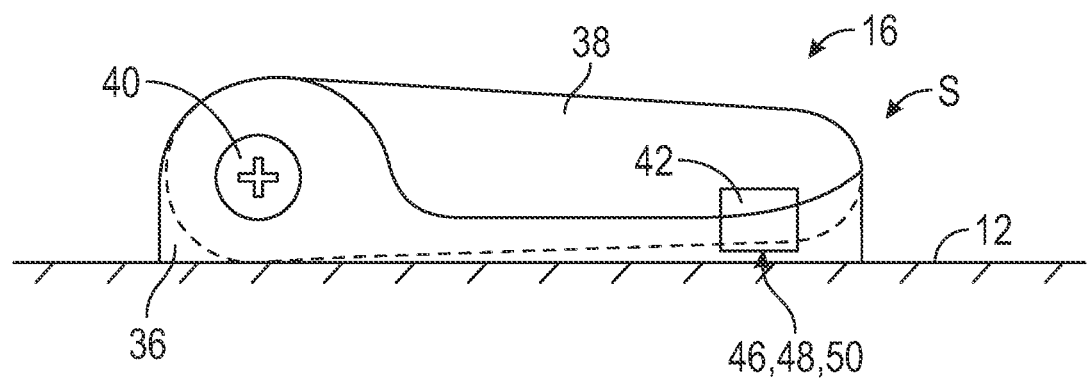
FIGS. 3A and 3B respectively illustrate one articulating camera arm having a pivoting arm respectively in the stowed position and the deployed position relative to a base secured to a vehicle.
Figure 3B:
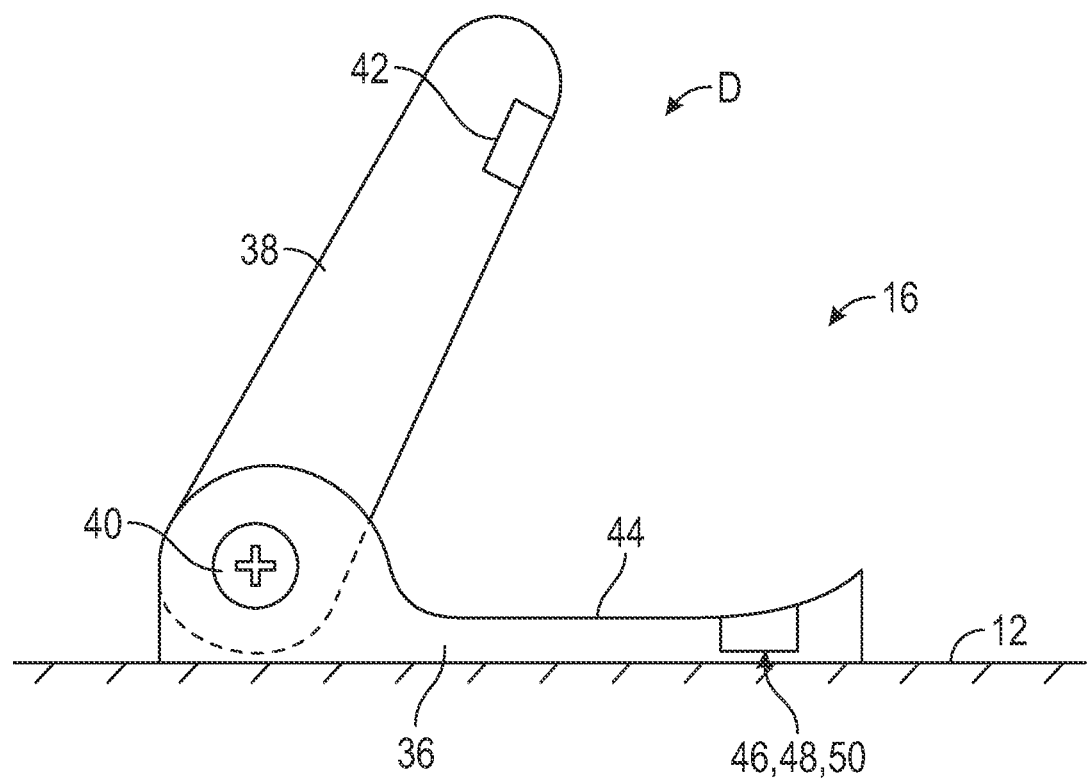

With continuing reference to FIG. 2, the controller 30 is in communication with a washer system 32 and an actuator 34. The controller 30 coordinates the folding of the camera arm 16 and operation of the washer system 32 to clean the camera. The camera arm 16 is shown in FIGS. 3A and 3B respectively in a stowed position S and a deployed position D. The camera assembly 42 is tucked into a pocket 44 in the base 36 when stowed to protect the camera assembly 42 from the environment.

The pivoting arm 38 is configured to articulate about a joint 40 with respect to the base 36, which is secured to the cab 12 using fasteners. A camera assembly 42 is provided on the pivoting arm, and at least one of a seal 46, a washer nozzle 48 and a wiper 50 are provided on the base 36 adjacent to the camera assembly 42 when in the stowed position S. Housing many of the components used for debris management on the base 36 rather than the pivoting arm 38 permits more flexibility in designing an aerodynamic shape for the pivoting arm 38 as well as enabling a smaller profile overall.

Figure 4A:
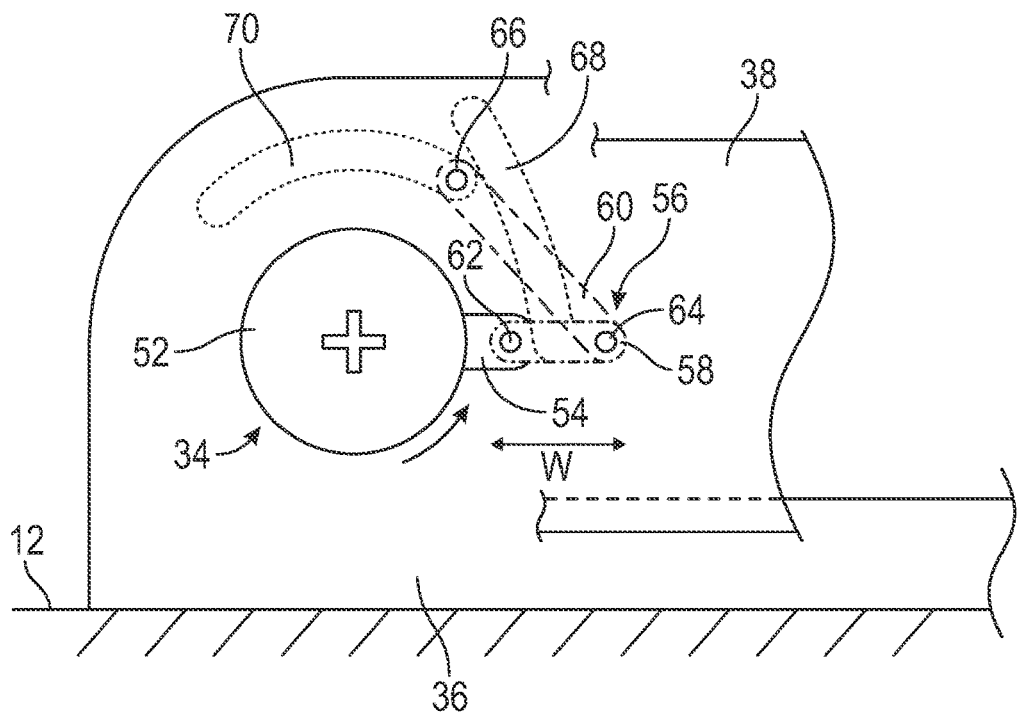
FIGS. 4A and 4B depict an example joint for articulating the pivoting arm respectively between the stowed position and the deployed position.
Figure 4B:
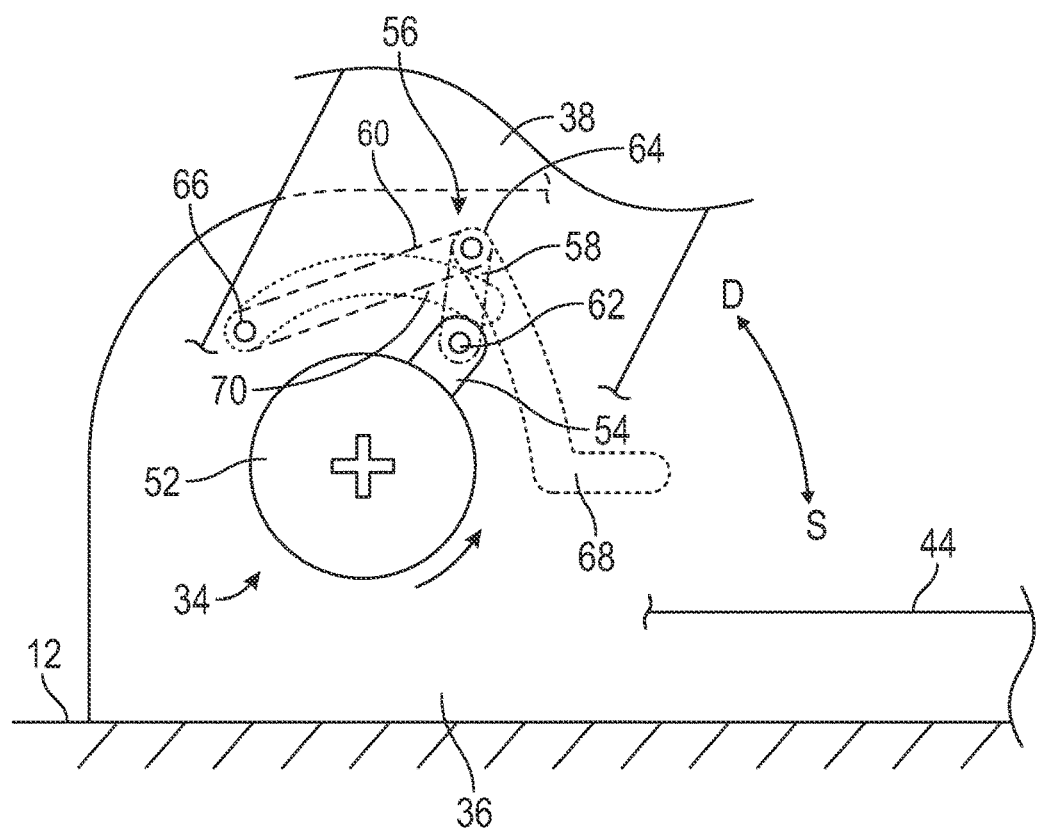

The actuator 34 and joint 40 are shown in more detail in FIGS. 4A and 4B. In the example, the joint 40 provides both sliding and rotating motion in response to input from a single actuator 34. The sliding motion cleans the camera, and the rotating motion folds and unfolds the camera relative to its operating position. In the example, the actuator 34 is an electric motor 52. However, it should be understood that the actuator 34 may be provided by a linear actuator, which may be electric or hydraulic. Any number of other actuator and joint configurations may be provided as desired.

In the example, the motor 52 has an arm 54 interconnected to a linkage 56 that rides in one or more guide tracks. In one example, the linkage 56 includes first and second links 58, 60 pivotally joined to one another. A first connection 62 joins one end of the first link 58 to the arm 54, and a second connection 64 on an opposite side of the first link rides along a first track 68. The second connection 64 is also interconnected to one end of a second link 60. An opposite end of the second link 60 includes a third connection 66 that rides in a second track 70. The linkage 56 and tracks 68, 70 cooperate to define both the sliding and rotating motion of the pivoting arm 38 relative to the base 36 in response to operation of the motor 52.

In operation, initial rotational movement of the arm 54 moves the pivoting arm 38 in a sliding direction W from the stowed position S, as shown in FIG. 4A. As the second connection 64 rides along the track, continued rotation of the arm 54 rotates the pivoting arm 38 from the stowed position S to the deployed position D, as shown in FIG. 4B. The actuator 34 and joint 40 are only examples and may be varied from the disclosed configuration.

Figure 5A:
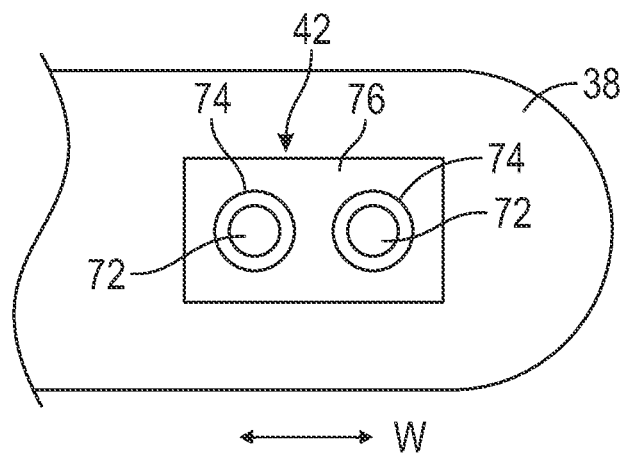
FIG. 5A is a front view of a camera assembly of the pivoting arm.

A front view of the pivoting arm 38 and its camera assembly 42 are shown in FIG. 5A. The camera assembly 42 includes at least one camera 20 with its optical lens 72 and image capture unit (now shown). In this example, multiple cameras 20 are used, each having a lens 72 associated with a respective image capture unit for providing images to the displays 18. However, it should be understood that only a single camera may be used to provide one or more views to one or more displays 18. The lens 72 may be surrounded by a heater 74, if desired, for melting snow and ice. A transparent cover 76 (e.g., clear glass or plastic) may be arranged over the lenses 72 to protect them from scratches and debris. When in the stowed position, the camera assembly 42 is received in the pocket 44 of the base 36.

Figure 5B:
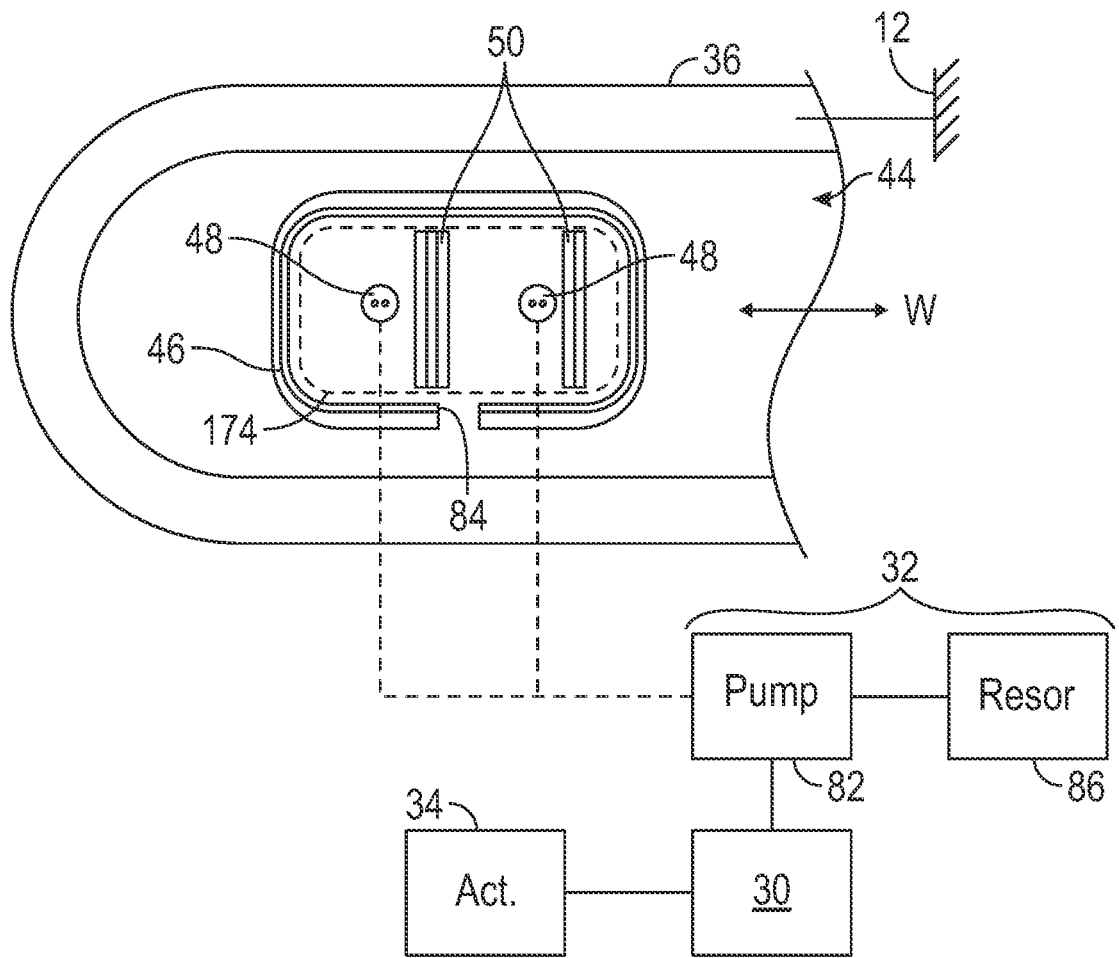
FIG. 5B is a front view of a wiper, a seal and a spray nozzle on the base.

Referring to FIG. 5B, the camera assembly 42 may be circumscribed by the seal 46 (e.g., rubber, foam or other material) to provide a sealing region that protects the camera(s) when in the stowed position S (e.g., when vehicle is parked). A drain may be provided to allow any water or debris to escape the camera sealing region to a location outside the camera sealing region. In one example, the drain 84 is provided by a gap in the seal 46.

One or more wipers 50 may be provided on the base. When the transparent cover 76 is used, the wiper(s) 50 are configured to wipe across the transparent cover 76 while the pivoting arm 38 moves in the sliding direction to remove debris. When no cover is used, the wiper(s) 50 may remove debris directly from the lens 72. A triple blade wiper (e.g., rubber with a plastic insert) may be provided for the camera assembly 42 as well as a washer nozzle 48 for spraying washer fluid from the washer system 32 prior to and/or during the wiping step. It may be desirable to provide multiple wipers 50 and/or nozzles 48. As is conventional, the washer system 32 may include a pump 84 that draws washer fluid from a reservoir 86.

If desired, the heater 174 may be provided on the base 36 to further reduce the number of components carried by the pivoting arm 38 so that a low aerodynamic profile may be maintained. Thus, the heater 174 arranged adjacent to the camera assembly 42 with the pivoting arm 38 in the stowed position S.

Figure 6:
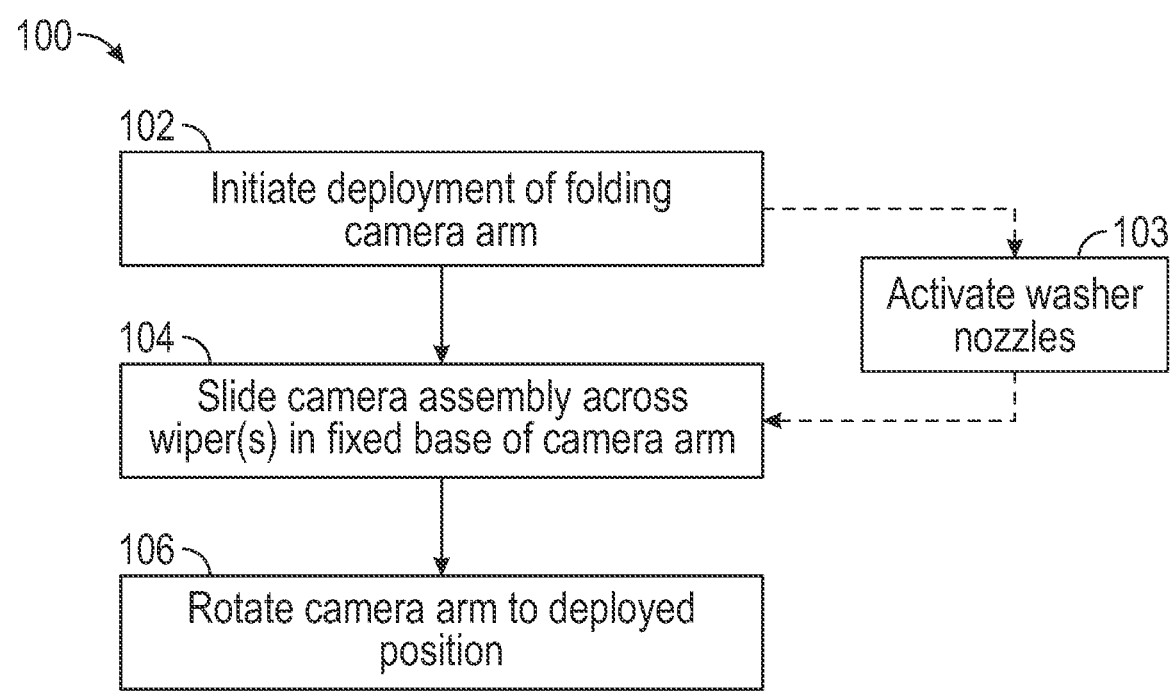
FIG. 6 is an example method of operating the disclosed camera debris removal system.

Referring to FIG. 6, a method of removing debris 100 includes initiating deployment of the folding camera arm (block 102) from the stowed position S to the deployed position D. The camera assembly 42, which is carried by the pivoting arm 38, slides across the wiper 50 in the base 36 of the camera arm 16 (block 104). If desired, a washer nozzle 48 may be activated prior to or during wiping (block 103). The pivoting arm 38 continues rotating to the deployed position D (block 106).

The controller 30 is configured to coordinate operation of the actuator 34 and the washer system 32 in response to an input. The heater 74, 174 may also by controlled and sequenced by the controller 30. For example, the camera assembly 42 may be pre-heated while stowed before a deployment is anticipated by the system (e.g., vehicle ignition or other event, like engine warm up). In one example, the folding/unfolding and/or wiping may be initiated in response to an input to the controller 30. For example, the pivoting arm 38 may be automatically moved to the stowed position(S) in response to the vehicle 10 being parked (e.g., input may be transmission switch), manually by the driver when debris is present as noticed by obstructions in the displayed image, or automatically when debris is detected by the CMS 15 (e.g., debris detected via image processing). The wiping may occur on moving from stowed position S to the deployed position D, vise versa, or during both. The nozzle(s) 48 may spray washer fluid at the camera assembly 42 during each operation of the camera arm 16, or at selected operating conditions.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A camera arm for a camera monitor system (CMS), comprising:
    a base configured to be secured to a vehicle, the base includes a wiper;
    a pivoting arm mounted on the base at a joint;
    an actuator configured to articulate the pivoting arm relative to the base with the joint;
    a camera assembly provided in the pivoting arm and configured to face rearward with the base secured to the vehicle; and
    wherein articulation of the joint is configured to move the pivoting arm between a deployed position and a stowed position, and the articulation of the joint moves the camera assembly across the wiper in a sliding direction only as the pivoting arm moves from the stowed position to the deployed position, and continued articulation of the joint rotates the pivoting arm in a rotational direction to the deployed position, wherein the sliding direction is different than the rotation direction.

2. The camera arm of claim 1, wherein the base includes a pocket receiving a portion of the pivoting arm that includes the camera assembly when in the stowed position.

3. The camera arm of claim 1, wherein the base includes a seal arranged about at least a portion of the wiper, the seal provides a camera sealing region configured to circumscribe the camera assembly when in the stowed position.

4. The camera arm of claim 3, comprising a drain from the camera sealing region to a location outside the camera sealing region.

5. The camera arm of claim 1, wherein the camera assembly includes a lens, and a transparent cover is arranged over the lens, the wiper is configured to wipe across the transparent cover while the pivoting arm moves in the sliding direction to remove debris on the transparent cover, wherein the sliding direction is linear.

6. The camera arm of claim 1, wherein the camera assembly includes a lens exposed to an exterior environment in the deployed position, the wiper is configured to wipe across the lens while the pivoting arm moves in the sliding direction to remove debris on the lens, wherein the sliding direction is linear.

7. The camera arm of claim 1, wherein the base includes a heater configured to be adjacent to the camera assembly with the pivoting arm in the stowed position.

8. The camera arm of claim 1, wherein the base includes at least a portion of a washer system having a spray nozzle configured to spray fluid on the camera assembly in response to an input.

9. A CMS comprising the camera arm of claim 8, further comprising a controller in communication with the actuator, the camera assembly, the washer system and the input, wherein the controller is configured to coordinate operation of the actuator and the washer system in response to the input.

10. A CMS comprising the camera arm of claim 1, wherein the camera assembly including an image capture unit configured to provide at least one of two fields of view, and comprising at least one display configured to depict at least portions of the at least one of two fields of view.

11. A camera arm for a camera monitor system (CMS), comprising:
    a base configured to be secured to a vehicle, the base includes a wiper;
    a pivoting arm mounted on the base at a joint;
    an actuator configured to articulate the pivoting arm relative to the base with the joint;
    a camera assembly provided in the pivoting arm and configured to face rearward with the base secured to the vehicle; and
    wherein articulation of the joint is configured to move the pivoting arm between a deployed position and a stowed position, and the articulation of the joint moves the camera assembly across the wiper in a sliding direction as the pivoting arm moves between the deployed and stowed positions, wherein the joint includes a linkage and at least one track configured to provide rotation of the pivoting arm and movement of the pivoting arm in the sliding direction relative to the base in response to operation of the actuator.

12. A method of removing debris from a camera monitor system (CMS) camera assembly, comprising:

actuating a pivoting arm that is mounted on a base secured to a vehicle;

articulating the pivoting arm about a joint relative to the base and between a deployed position and a stowed position;

linearly sliding the pivoting arm relative to the base in a sliding direction in response to the articulating step;

rotating the pivoting arm relative to the base in a rotation direction subsequent to the sliding step when moving the pivoting arm from the stowed position to the deployed position, wherein the sliding direction is different than the rotation direction; and wiping a camera assembly on the pivoting arm across a wiper supported on the base in response to the sliding step.

13. The method of claim 12, comprising a step of rotating the pivoting arm relative to the base prior to the sliding step when moving the pivoting arm from the deployed position to the stowed position.

14. The method of claim 12, comprising a step of receiving a portion of the pivoting arm in a pocket in the base in response to moving the pivoting arm to the stowed position.

15. The method of claim 12, comprising a step of placing the camera assembly adjacent to a heater in the base in response to moving the pivoting arm to the stowed position.

16. The method of claim 12, comprising a step of placing the camera assembly adjacent within a boundary of a seal on the base in response to moving the pivoting arm to the stowed position.

17. The method of claim 12, comprising a step of spaying a washer fluid at the camera assembly prior to performing the wiping step.

* * * * *